United States Patent [19]
Chien et al.

[11] Patent Number: 5,022,032
[45] Date of Patent: Jun. 4, 1991

[54] PHASED COUPLED WAVEGUIDE LASER

[75] Inventors: Kuei-Ru Chien, Cerritos; John H. S. Wang, Rancho Palos Verdes; James G. Jacobson, Torrance, all of Calif.

[73] Assignee: Hughes Aircraft Company, Los Angeles, Calif.

[21] Appl. No.: 522,619

[22] Filed: May 14, 1990

[51] Int. Cl.⁵ ............................................. H01S 3/098
[52] U.S. Cl. ...................................... 372/18; 372/97; 372/35
[58] Field of Search .................. 372/18, 92, 97, 35, 372/64

[56] References Cited

U.S. PATENT DOCUMENTS

| | | | |
|---|---|---|---|
| 4,688,228 | 8/1987 | Newman et al. | 372/18 |
| 4,807,233 | 2/1989 | Hart et al. | 372/18 |
| 4,879,721 | 11/1989 | Braski et al. | 372/18 |
| 4,884,282 | 11/1989 | Bridges | 372/64 |

Primary Examiner—Léon Scott, Jr.
Attorney, Agent, or Firm—William J. Streeter; Wanda K. Denson-Low

[57] ABSTRACT

A high power phase coupled waveguide laser comprising a plurality of symmetrically disposed lasing members disposed around the outer periphery of an annular enclosure. The laser includes an annular body of dielectric material having a multiplicity of laser cavities formed therein in a symmetrical annular array. The body includes a central bore having conduits extending therethrough for providing a flow of cooling fluid. The heat path between the cavities and the cooling fluid is symmetrical for all cavities. This provides equal conditions for all laser cavities in the array and ensures phase coupling of all cavities.

14 Claims, 2 Drawing Sheets

PHASED COUPLED WAVEGUIDE LASER

BACKGROUND

The present invention relates to lasers and, more particularly, to an improved phase coupled waveguide laser.

Since the advent of the Space Defense Initiative (SDI) there has been an increasing need for a practical high power, long range CO2 laser radar source. Prior art attempts to meet the need for such a laser radar source have used a linear phase coupled waveguide configuration. Linear phase coupled waveguide lasers have been demonstrated by many researchers to provide stable output with as many as three laser waveguide bores coherently coupled. When a photon leakage path is introduced between adjacent, closely spaced waveguide bores, the laser output behaves as if a single device were operating. This attribute makes the coupled waveguide laser a possible candidate for a high power laser radar source in a compact package.

Research work at United Technology Research Center (UTRC) resulted in a five-bore waveguide laser. It employed three central bores and two outside bores in a linearly configured waveguide laser. Unfortunately, researchers were unable to phase lock this five-bore waveguide laser. The researchers at UTRC attributed this failure to the different gain distribution for the two outside bores adjacent to the cooling wall as compared to the three central bores. The conclusion reached is that it is difficult to scale up linear phase coupled waveguide configurations to high power and at the same time maintain a compact size. This was demonstrated when researchers scaled a linear phase coupled waveguide up to five waveguide bores and failed to phase lock them together.

Accordingly, it is an objective of the present invention to provide an improved phase coupled waveguide CO2 laser suitable for use as a compact, high power, long range laser radar source. Another objective of the invention is the provision of a phase coupled waveguide laser having a symmetrical arrangement. A further objective of the present invention is to provide a phase coupled waveguide laser that ensures the same physical condition for all bores. Yet another objective of the invention is the provision of a phase coupled waveguide laser having a design that is easily scalable. A still further objective of the present invention is to provide an improved phase coupled waveguide CO2 laser that is compact.

SUMMARY OF THE INVENTION

In accordance with these and other objectives and features of the present invention, there is provided an improved phase coupled waveguide CO2 laser having a plurality of elongated laser bores arranged in an annular configuration. The laser bores are formed by milling longitudinal radial grooves in an elongated cylinder made of a dielectric material such as ceramic A second cylinder is slipped over the grooved cylinder to form the outer walls of the plurality of bores. Portions of the walls between adjacent bores are trimmed or scalloped in a staggered pattern to provide a photon leakage path. A laser gas such as carbon dioxide (CO2) is disposed in the plurality of elongated laser bores. An optical assembly is mounted on each end of the laser and includes reflectors which reflect light energy from the laser gas discharge within the elongated laser bores so that the light energy travels longitudinally the length of the elongated laser bores. Electrodes are provided in the walls of the laser for transversely exciting the laser gas. An energy generator applies a voltage of alternating polarity between the electrodes at a frequency of 30–200 MHz to establish a laser gas discharge in the laser gas.

The electrodes comprise two coaxial copper foils separated by the dielectric. This provides the transverse electric field in the elongated laser bores. RF power is fed through an RF feedthrough with a Pyrex corona shield to the outside copper electrode and discharged through the laser waveguide bores. Internal cylinders are used for water cooling and also serve as the ground return for the RF discharge. This annular configuration provides a symmetrical assembly in which all of the annular laser bores are subjected to a substantially identical thermal environment.

Because this annular design provides compactness, efficient cooling, matched physical condition for all waveguide bores, and ease of scaling to high power, it provides a viable, compact, high power, long range CO2 laser radar source.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
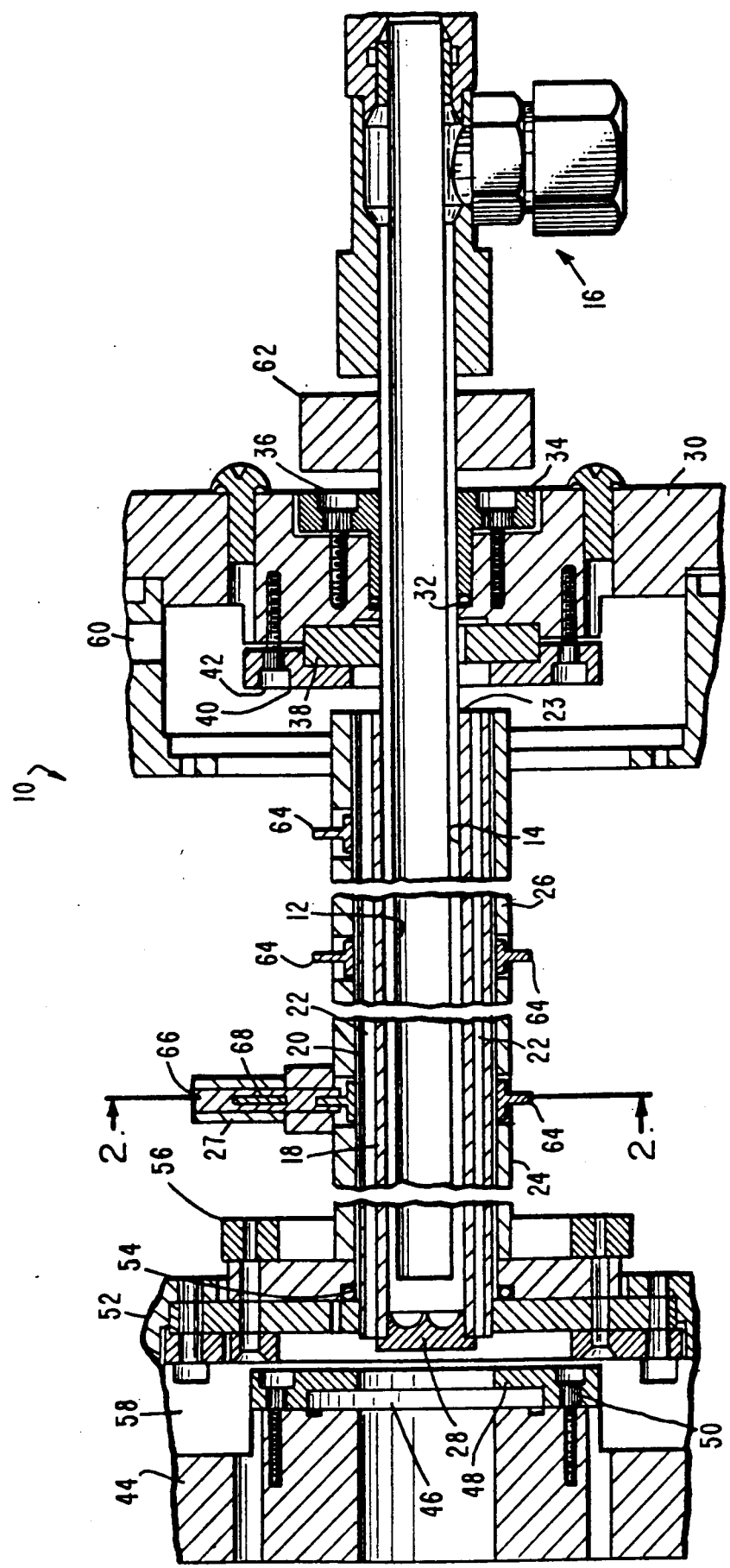
FIG. 1 is a cutaway side view of a phase coupled waveguide laser in accordance with the principles of the present invention.

Referring now to FIG. 1 of the drawings, there is shown a cutaway side view showing the interior of an annular phase coupled waveguide laser 10 constructed in accordance with the principles of the present invention. The laser 10 shown in FIG. 1 is disposed inside an outer enclosure (not shown) which is operated at 0.1–0.2 atmospheres. The annular phase coupled waveguide laser 10 is built up in concentric fashion around an elongated central axis. The innermost part is an inner cooling tube 12 which is an elongated hollow tube made of stainless steel, having an outer diameter of 0.340 inches and a wall thickness of 0.005 inches, for example, which serves as an outlet tube for a coolant such as water, for example. The inner cooling tube 12 in the present exemplary embodiment is substantially 30 cm in length and has a diameter of approximately 0.9 centimeters. The inlet end of the inner cooling tube 12 is at the left as viewed in FIG. 1, and the outlet is at the right. The inner cooling tube 12 is supported in a cantilever manner from the outlet end, and one or more spiders (not shown) maintain concentric, coaxial spacing along the length thereof.

An outer cooling tube 14 is disposed concentrically around the outside of the inner cooling tube 12. The outer cooling tube 14 in the present exemplary embodiment is approximately 0.500 inch in diameter and is made of a conductive material such as copper, for example. The outer cooling tube 14 extends beyond the inlet end of the inner cooling tube 12. The outer cooling tube 14 serves an an inner ground electrode for the annular phase coupled waveguide laser 10 as well as providing for the cooling thereof. The coolant such as water, for example, enters the annular phase coupled waveguide laser 10 by way of a fitting 16 at the right end thereof as viewed in FIG. 1. The coolant flows to the left in the space between the two concentric tubes 12, 14 and at the left end thereof the coolant flows inward toward the central axis and enters the inlet end of the inner cooling tube 12. The coolant flows from left to right in the inner cooling tube 12 and exits the annular phase coupled waveguide laser 10 through another fitting (not shown).

A slotted tube 18 made of an insulating or dielectric material such as ceramic, aluminum oxide, or the like is disposed around the outer cooling tube 14. The slotted tube 18 has twenty four milled longitudinal grooves or slots around the periphery thereof. Each groove or slot is separated by a thin wall or web. The slotted tube 18 fits inside a depolarizer tube 20 with a slip fit on the order of 0.0005 inch. The grooves or slots in the slotted tube 18 which are bounded by the inner cylindrical wall or surface of the depolarizer tube 20 define twenty four annular waveguide laser bores 22. Thus, the outer cylinder or depolarizer tube 20 serves as the cover for the slotted tube 18 and for the laser bores 22. The depolarizer tube 20, is also made of a ceramic material such as aluminum oxide, for example.

The bores 22 are disposed symmetrically in an annular arrangement in the slotted tube 18 resulting in a so-called "gatling gun" appearance. As viewed in FIG. 1, only two of the 24 longitudinal annular bores 22 may be seen, one at the top and one at the bottom. The bores 22 have a U-shaped cross section rather than a circular cross section. That is, the bores 22 are not holes having closed walls. The bores 22 are rounded in the region closest to the central axis and extend radially outward therefrom to the inner wall of the depolarizer tube 20. The slotted tube 18 is fitted snugly to the outer cooling tube 14, and a vacuum and water tight seal is made at the juncture of the two parts at the rightmost end of the tubes 14, 18 as shown in FIG. 1, identified by arrow 23. The slotted tube 18 is adapted to be cooled by the coolant flowing in cooling tube 14. The annular configuration of the phase coupled waveguide laser 10 provides a symmetrical assembly in which all of the waveguide laser bores 22 are subjected to a substantially identical thermal environment.

A photon leakage path is established between adjacent, closely spaced waveguide bores 22. A portion of each of the twenty four longitudinal walls or webs is removed by trimming half the wall height away in a staggered pattern. Approximately 50% of the length of each wall remains full height, and approximately 50% of the length is trimmed. One wall is trimmed or scalloped in the central portion, while the two adjacent walls are trimmed or scalloped toward each end, leaving the central portion at full height.

An outer electrode 24 which comprises a conductive cylinder made of a metal such as copper, for example, is disposed around the outside of the depolarizer tube 20 and extends for almost the full length thereof. A glass cylinder 26 is disposed around the outside of the outer electrode 24 and serves as a corona shield. A coolant plug or end cap 28 is disposed in the left end of the slotted tube 18 as viewed in FIG. 1. The end cap 28 serves as a vacuum and water seal plug and is provided with an annular ridge or shoulder that is glued into the ceramic slotted tube 18. The end cap 28 is provided with an annular groove with a rounded bottom that deflects coolant from the outer cooling tube 14 into the inner cooling tube 12. That is, the groove in the end cap 28 assists the coolant in making the 180° reversal in direction of flow.

A first tilt plate 30 made of a material such as aluminum, for example, is disposed at the right end of the slotted tube 18 and serves as a carrier for a total reflector mirror 38. The first tilt plate 30 is annular in shape and has an opening in the center through which passes the outer cooling tube 14. The first tilt plate 30 also serves as a housing for a vacuum seal ring 32, which is an Ultra-Torr type vacuum seal that is disposed around the outer cooling tube 14. A seal clamp 34 is provided to squeeze the seal ring 32 against the first tilt plate 30 and cooling tube 14. For this purpose, screws 36 are provided and are threadably engaged with tapped holes in the first tilt plate 30. The first tilt plate 30 is provided with an annular shoulder against which the seal ring 32 is compressed. The seal ring 32 is similar to an O ring and provides vacuum seal.

The total reflector mirror 38 is annular in shape and is clamped in a recess provided in the tilt plate 30 by a mirror holding structure 40. The mirror 38 may be made of oxygen-free high conductivity copper, or the like, and is highly polished. The mirror holding structure 40 is annular and has an opening in the center which is large enough in diameter to permit energy from the laser bores 22 to be totally reflected from the mirror 38 back into the bores 22. The mirror 38 is clamped into the recess provided in the first tilt plate 30 by means of screws 42 which are threaded into holes in the first tilt plate 30. The mirror 38 is adapted to be tilted by movement of the first tilt plate 30 so as to provide complete internal reflection for the laser bores 22.

At the opposite end of the slotted tube 18, there is provided a second tilt plate 44. The second tilt plate 44 is provided with a partially transmissive mirror 46 that is disc-shaped. This mirror 46 may be made of zinc selenide, or the like, and has a reflectivity of 70-90%. It serves as an output optical window for the annular phase-coupled waveguide laser 10. The partially transmissive mirror 46 is held by a mirror holding structure 48 and screws 50 which are threaded into the second tilt plate 44. The partially transmissive mirror 46 is also tiltable by moving the second tilt plate 44. The partially reflective mirror 46 is positioned such that up to 90% of the energy from the laser bores 22 is reflected back into the bores 22.

A gas seal 52 surrounds the left end of the slotted tube 18 and is provided with a seal ring 54 which is squeezed by an annular clamp 56. This seal ring 54 is also an Ultra-Torr type of water or vacuum seal resembling an O ring. The annular phase-coupled waveguide laser 10 is provided with an input port 58 to provide laser gas mix to the laser bores 22. An output port 60 is also provided for flowing the lasing gas. The laser gas mixture is comprised of carbon dioxide, nitrogen, xenon and helium.

A ground clamp 62 is clamped around the outside of the outer cooling tube 14. The ground clamp 62 and the outer cooling tube 14 serve as the inner electrode for the annular phase-coupled waveguide laser 10. The outer electrode 24 is provided with a plurality of electrode pins 64 which are brazed or soldered thereto. Some of the electrode pins 64 are used for coupling RF energy into the annular phase-coupled waveguide laser 10. The remaining electrode pins 64 are employed for coupling tuning or matching coils (not seen in FIG. 1) to the annular phase-coupled waveguide laser 10. When the RF voltage is applied to the laser 10, there is a tendency for the voltage to drop along the length thereof. The tuning or matching coils are connected to a plurality of electrode pins 64, for example to four or five electrode pins 64, for restoring the voltage to full level along the length of the laser 10. A feed-through 66 is provided with an elongated female extender 68 that is coupled onto the outer end of one of the electrode pins 64.

Figures 2, 3:
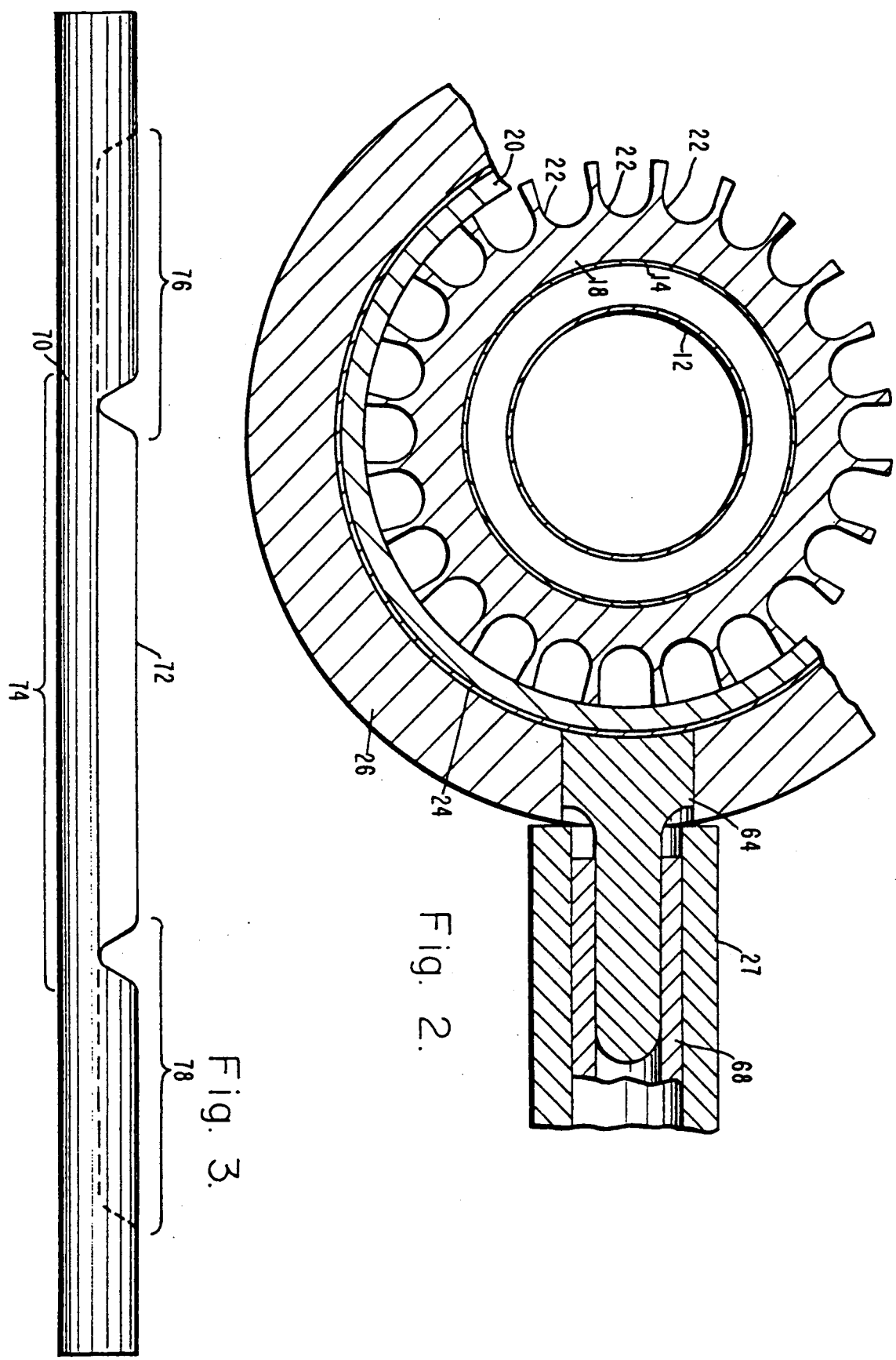
FIG. 2 is an enlarged broken away cross-sectional view of the laser taken along section line 2—2 of FIG. 1.
FIG. 3 is a diagrammatic representation of the coupling arrangement that establishes the photon leakage path between adjacent laser bores.

Referring now to FIG. 2, there is shown a broken away cross-sectional view of the laser 10 taken along the line 2—2 of FIG. 1. In FIG. 2, there may be seen that the laser bores 22 are milled annularly into the slotted tube 18. The slotted tube 18 is closely fitted to the outer cooling tube 14 in order to provide uniform temperature control to all the annular laser bores 22 in the slotted tube 18. Concentrically located inside the outer cooling tube 14 is the inner cooling tube 12 which conducts the coolant away to the outlet from the laser 10. As may be clearly seen in FIG. 2, the depolarizer tube 20, which is shown broken away in the figure serves as a cover to the slotted tube 18 and this closes the laser bores 22 and forms the outer wall thereof.

The outer cooling tube 14 forms the inner electrical electrode while the outer electrode 24 is fitted around the depolarizer tube 20. One of the electrode pins 64 connected to the outer electrode 24 may be seen in FIG. 2. A female extender 68 is connected to the electrode pin 64. The glass cylinder 26 which acts as the corona shield is fitted around the outer electrode 24. A glass cylinder 27 acts as a corona shield around the female extender 68.

Referring now to FIG. 3 of the drawings, there is shown a diagrammatic representation of the coupling arrangement that establishes the photon leakage path between adjacent closely spaced laser bores 22. FIG. 3 shows the staggered pattern of the trimming of adjacent walls between laser bores 22. FIG. 3 shows a representation of a first wall 70 superimposed on a second wall 72. Half the height of the first wall 70 is trimmed or removed in a central region 74. Approximately 50% of the length of the first wall 70 remains full height and approximately 50% of the length is trimmed. The second wall 72 is trimmed or scalloped near the ends in two regions 76, 78, leaving the middle at full height. Approximately half the height of the second wall 72 is trimmed away in these two regions 76, 78. The net result is approximately half the length of the second wall 72 remains full height and approximately half the length is trimmed. Thus, as may be seen in the illustration, adjacent walls 70, 72 are trimmed in a staggered pattern to provide photon coupling between adjacent laser bores 22.

In operation, the annular phased coupled waveguide laser 10 is charged with laser gas mix, the fully reflective mirror 38 and the partially transmissive mirror 46 are adjusted. The coolant is pumped into the outer cooling tube 14 and exits via the inner cooling tube 12, and RF energy is applied to the outer electrode 24. The RF energy is discharged through the waveguide bores 22 to the outer cooling tube 14 ground. This serves as the energy pump for the laser 10. The gas mix lases and the laser light is emitted from the partially transmissive mirror 46. Because of the coupling region provided, all of the 24 laser bores 22 phase lock together.

Thus there has been described a new and improved phase coupled waveguide $CO_2$ laser suitable for use as a compact, high power, long range laser radar source. This novel phase coupled waveguide laser has a symmetrical arrangement that ensures the same physical condition for all bores. This novel phase coupled waveguide laser also has a design that is easily scalable and that is compact.

It is to be understood that the above-described embodiment is merely illustrative of some of the many specific embodiments which represent applications of the principles of the present invention. Clearly, numerous and other arrangements can be readily devised by those skilled in the art without departing from the scope of the invention. For example, differing numbers and diameters of laser bores may be fabricated, and the partitioning arrangement and photon leakage path arrangement may be modified to suit a particular application.

What is claimed is:

1. A phase coupled waveguide laser comprising:
   a pair of coaxially disposed cylindrical electrodes;
   an annular body of dielectric material having an internal bore disposed between the electrodes and bounded thereby, said annular body of dielectric material having a plurality of symmetrically disposed elongated cavities disposed around the outer periphery thereof;
   lasing gas medium disposed in each of the plurality of cavities;
   a fully reflective mirror and a partially transmissive mirror closing opposite ends of the cavities;
   means connected to the electrodes for applying radio frequency lasing energy to the electrodes;
   cooling means coupled to the internal bore of the annular body for cooling the cavities, and
   coupling means to provide photon coupling between adjacent cavities whereby the laser energy of all waveguides is phase locked together.

2. The laser of claim 1 wherein the annular body includes an inner shell and an outer shell, and having a multiplicity of grooves formed in a surface of one of the shells and having the grooves closed by a contiguous surface of the other of the shells.

3. The laser of claim 2 wherein the electrodes are electrical conductors and further including means for connecting one of the electrodes to a source of radio frequency energy, and means for connecting other of the electrodes to ground.

4. The laser of claim 3 further including a dielectric housing enclosing the outer one of the electrodes;
   the connecting means including a plurality of connecting pins each having a surface complimentary to the external surface of the outer one of the electrodes and being contiguous thereto;
   the pins extending outwardly through the dielectric housing.

5. The laser of claim 4 wherein the cooling means comprises the bore of the inner one of the electrodes and further includes a cylindrical conduit disposed coaxially within the inner electrode in spaced relationship thereto;
   the inner electrode and the conduit defining coaxially disposed annular and cylindrical fluid passages;

and having the opposite ends thereof connected to the output and return of a source of cooling fluid.

6. The laser of claim 5 further including a plurality of fluid conduits whereby cooling fluid flows into the annular fluid passage, through the annular fluid passage into the cylindrical passage, and through the cylindrical fluid passage.

7. The laser of claim 6 further including means for transmitting cooling fluid through the annular and cylindrical fluid passages.

8. The laser of claim 7 wherein cooling fluid flows within the annular and cylindrical fluid passages in respectively opposite directions.

9. The laser of claim 8 wherein a plurality of connector pins are connected to the outer electrode in diametrically opposed pairs spaced apart along the length of the outer electrode, all of said connector pins lying in substantially the same plane.

10. The laser of claim 9 wherein the lasing material comprises a mixture of gases containing predetermined amounts of carbon dioxide, nitrogen, xenon and helium.

11. The laser of claim 10 wherein the dielectric material comprises ceramic.

12. The laser of claim 11 wherein there are twenty four of the cavities formed in a symmetrical array.

13. The laser of claim 12 further including a lasing gas medium photon cavity in gas communication with the open ends of the cavities.

14. The laser of claim 13 wherein one of the photon coupling cavities has one sidewall thereof closed with an aperture window, the other sidewall of the photon coupling cavity having one wall thereof closed with a staggered pattern.

* * * * *